Patented July 29, 1930

1,771,615

UNITED STATES PATENT OFFICE

JOSEPH BRINCIL, OF READING, PENNSYLVANIA

POROUS BEARING BODY

No Drawing.     Application filed April 11, 1928. Serial No. 269,310.

This invention relates to bearings and bearing washers and their manufacture, particularly of the resinous type such as are made from a phenol-formaldehyde condensation product.

There is at present on the market and sold under the trade name of "bakelite" oilless bearings, which are made by intimately mixing a powdered phenol-formaldehyde condensation product with a solid lubricant such as graphite, talc or soapstone, then molded to the desired shape by means of heat and pressure.

On the whole it forms a satisfactory bearing for certain usages, but its uses are limited to comparatively low speeds, when used as self lubricating bearings because of only having a solid lubricant to function as the lubricating medium.

It is the object of this invention to provide a bearing of this type that will be porous and be capable of absorbing lubricating oils thruout its interior, and therefore extend its uses to higher speeds.

I do this by intimately mixing a powdered phenol-formaldehyde condensation product with a powdered metal such as zinc, then compressing the mixture in a mold of the desired shape by means of heat and pressure and subjecting the result to an acid bath to remove or dissolve the powdered metal, after which the compressed body is removed from the acid bath to a hot water bath to dilute or wash out the acid, and then immersing the compressed body in an alkaline bath to neutralize any possible traces of acid, then placing the compressed body in hot water again to thoroughly cleanse the pores.

The compressed body is then placed in an oven whose temperature is about 200° F. to volatilize the remaining moisture in the pores, after which the thoroughly cleansed body is impregnated with a bearing oil by immersing the body in a hot bath of lubricating oil.

The resultant product is a porous resinous body capable of absorbing a lubricating oil.

As one specific method of carrying out my invention I proceed by intimately mixing 70 parts of a powdered phenol-formaldehyde condensation product with 30 parts of zinc powder, or if a solid lubricant is to be added the mixture will comprise 60 parts of a phenol-formaldehyde condensation product, 10 parts of either graphite, soapstone or talc, and 30 parts of zinc powder.

The mixture is then placed in molds adapted for either cylindrical bearings or bearing washers.

The bearing molds are fastened to the beds of standard hydraulic machines used for this type of work, and the molds are uniformly heated by steam. The desired mixture is then compressed to the desired shape by means of heat and pressure of about 2000 pounds per square inch.

The resultant product is a hard and solid body not capable of absorbing liquid.

The next step consists in immersing the compressed body in a suitable acid capable of dissolving the metallic powder. As is well known the powdered phenol-formaldehyde condensation product known on the market under the trade name of "bakelite"; is insoluble in most solvents, is infusible, not affected by any acids, steam or heat, and is impervious to water, therefore when the compressed body is immersed in an acid such as hydrochloric or sulphuric, the resinous part of the compressed body is unaffected by the acid, and the powdered metallic constituents are dissolved, thereby rendering the compressed body porous to the extent of the proportion of the powdered metal contained therein.

If powdered graphite is used in the mixture, the same procedure can be followed because graphite is quite like resin in some properties, being unaffected by acids or alkalies, and very stable under heat.

The compressed bodies should be agitated while submerged in the acid to continually keep up the violent action of the acid upon the powdered metal.

The compressed bodies are kept in the acid solution about two hours after which they are removed from the acid solution and dipped and agitated in a bath of hot water to wash out the acid in the pores of the compressed body, brought about by the dissolving of the powdered metal.

The next step consists in removing the compressed bodies from the hot water bath to any alkaline bath such as a soda solution, so as to be sure and neutralize the last remaining traces of any acid.

The compressed bodies are then agitated in the alkaline solution for about one-half an hour, and then rinsed or dipped in hot water, to thoroughly cleanse the pores.

The pores in the compressed bodies upon removal from the hot water bath are filled with moisture, which is removed by placing the bodies in an oven containing a temperature of about 200° F.

The heat in the oven evaporates the moisture from the pores, and renders the bodies ready for impregnation with lubrication oils.

This is done by immersing the cleansed porous compressed bodies in a bath of hot lubricating oils, the temperature being about 180° F.

While I have mentioned zinc powder in my preferred form of embodiment, it should be understood that other metallic powders will serve the purpose, also other resins may be used besides the phenol-formaldehyde condensation products.

I claim:—

1. The method of making a porous bearing body capable of absorbing liquid, which consists in intimately mixing a finely divided resinous product with a finely divided solid lubricant, and finely divided metal, then molding the mixture to the desired form by means of heat and pressure, and immersing the molded form in a bath of acid to dissolve the powdered metal.

2. The method of making a porous bearing body capable of absorbing liquid, which consists in intimately mixing finely divided resin, solid lubricant, and metal, then molding the mixture to the desired form with the aid of heat and pressure, and subjecting the molded form to a series of baths comprising acid, and water to dissolve the powdered metal and wash out the acid in the compressed body.

3. The method of making a porous bearing body capable of absorbing liquid, which consists in intimately mixing finely divided resin, solid lubricant and metal, then molding the said mixture to the desired form by means of heat and pressure, and subjecting the molded form to a series of baths comprising acid, water, alkali and then water, to dissolve the powdered metal and neutralize the chemicals in the compressed body.

4. The method of making a porous bearing body capable of absorbing liquid, which consists in intimately mixing finely divided resin, solid lubricant, and metal, then molding the said mixture to the desired form by means of heat and pressure, and subjecting the molded form to a series of chemical actions to render the compressed body porous, and free from chemicals and placing the porous and cleansed body in a heated atmosphere to volatilize the moisture contained therein.

5. The method of making a porous bearing body capable of absorbing liquid, which consists in intimately mixing finely divided resin, solid lubricant, and metal, then molding the said mixture to the desired form by means of heat and pressure, and subjecting the molded form to a series of chemical baths, to render the body porous and free from chemicals, placing the porous and cleansed body in a heated atmosphere to volatilize the moisture contained therein, and impregnating the cleansed porous body with a lubricating oil.

6. The method of making a porous bearing body capable of absorbing liquid which consists in intimately mixing a powdered phenol-formaldehyde condensation product with powdered metal, then molding the mixture to the desired form by means of heat and pressure, and then subjecting the said molded form to a series of chemical baths to render the said body porous and free from chemicals and then impregnating the said body with a lubricating oil.

7. The method of making a porous bearing body capable of absorbing liquid which consists in mixing a resinous product with a finely divided metal, then molding the mixture to the desired form by means of heat and pressure, and then subjecting the said molded form to a series of chemical baths and heat, to render the said body porous and free from moisture, and then impregnating the said body with a lubricating oil.

8. A bearing body comprising a porous structure of a compressed resinous product and capable of absorbing a liquid.

9. A bearing body comprising a porous structure of a resin and solid lubricant and capable of absorbing a lubricating oil.

10. A bearing body comprising a porous structure of a phenol-formaldehyde condensation product and capable of absorbing a lubricating oil.

11. A bearing body comprising a porous structure of a powdered resin and powdered solid lubricant, and capable of absorbing a liquid.

12. A bearing body comprising a porous structure of a powdered phenol-formaldehyde condensation product and powdered graphite, and capable of absorbing a lubricating oil.

In testimony whereof I affix my signature.

JOSEPH BRINCIL.